May 16, 1944.    I. W. McCUE    2,348,743
SELF-CONFORMING TRACTOR JACK
Filed May 29, 1942
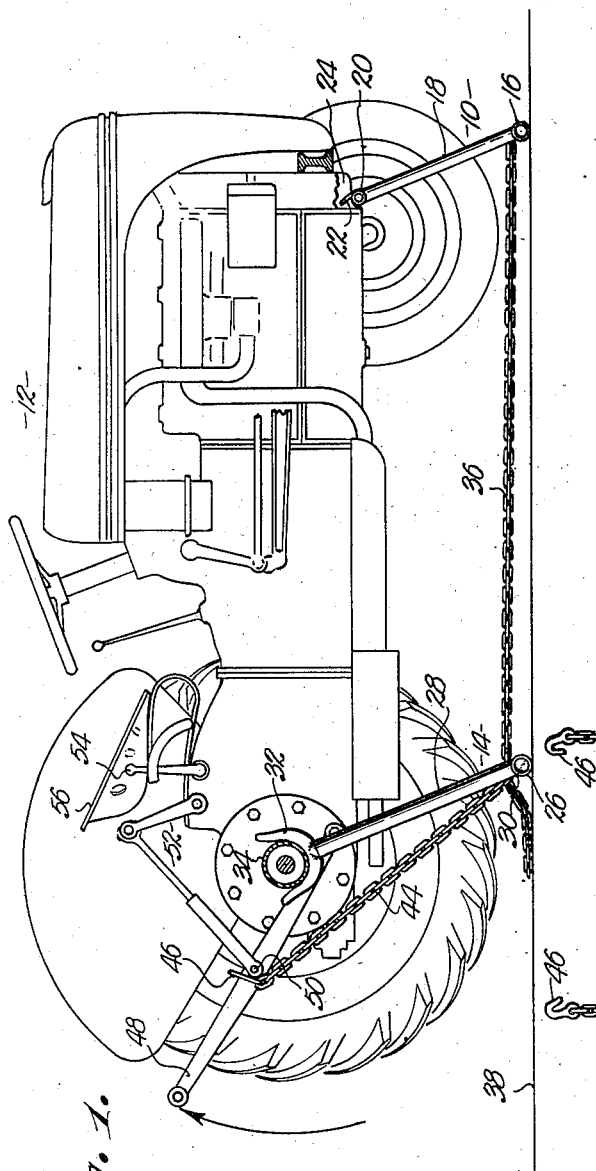
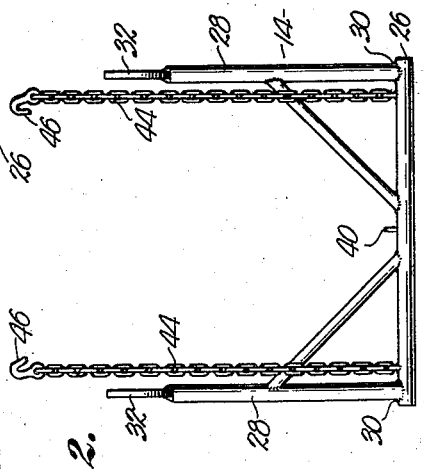
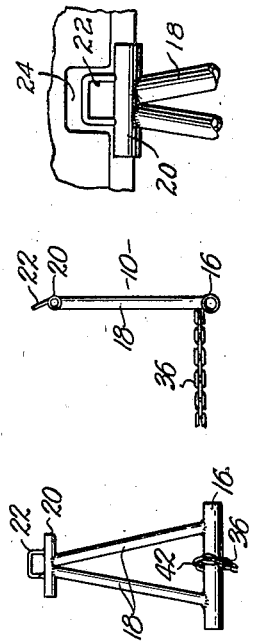
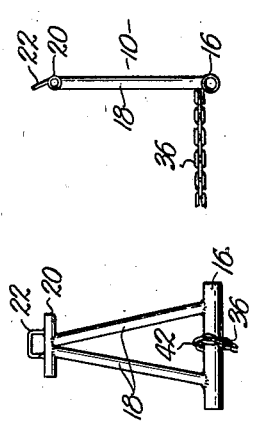
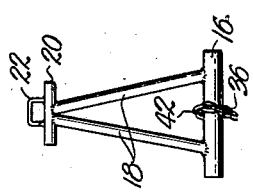
INVENTOR.
Irl W. McCue
BY
ATTORNEY.

Patented May 16, 1944

2,348,743

UNITED STATES PATENT OFFICE 2,348,743

SELF-CONFORMING TRACTOR JACK

Irl W. McCue, Farmingdale, N. Y.

Application May 29, 1942, Serial No. 444,977

2 Claims. (Cl. 254—94)

This invention relates to jacking apparatus of the character particularly adapted for use with tractors having hydraulic mechanism and operating links, and the primary object is to provide a simple, durable and easily applicable apparatus having self-conforming parts whereby the tractor may be lifted from a supporting surface regardless of the contour thereof.

This invention has for a further aim to provide a self-conforming tractor jack having as a part thereof, unique stands, both of which are equipped with means for engaging the tractor to hold the stands against accidental displacement when they are disposed at an angle to the vertical between the supporting surface and the lower portion of the tractor.

A yet further aim of this invention is to provide a tractor jack of the aforementioned character having as a part thereof, flexible and adjustable members interconnecting the two stands and also joining the part of the hydraulic mechanism with at least one of said stands, all for the purpose of contributing to the flexibility and usefulness of the apparatus.

Other objects of this invention include minor details of construction, all of which are important and will appear during the course of the following specification, referring to the accompanying drawing, wherein:

Fig. 1 is a side elevational view of the self-conforming tractor jack made in accordance with this invention, and shown in the operative position, the front and rear axles of the latter being shown in cross section adjacent the left side of the tractor engine and differential respectively.

Fig. 2 is an elevational view of one of the stands and its associated flexible interconnecting members.

Fig. 3 is a side elevational view of the forward stand.

Fig. 4 is an edge elevational view thereof; and

Fig. 5 is an enlarged fragmentary front elevational view of the upper end of the forward stand having a projection extending into a slot or recess of the tractor.

The efficiency of tractor jacks of the type embodying this invention depends to a great extent, upon the ability of the jacking apparatus to be readily applied regardless of the contour of the supporting surface and to have the component parts thereof conform to the dimensions presented when uneven terrain is encountered. Also, in the placement of tractor jacks it is necessary that the stands, forming the major portion thereof, be disposed at an angle to the vertical between the under side of the tractor and the supporting surface and there held until sufficient power can be applied to lift the tractor by moving the stands of the jack toward the true vertical position.

The embodiment of the tractor jack selected to illustrate this invention, comprises a relatively short stand 10 for the forward portion of tractor 12, and a stand 14 of appreciably greater length, for the rearmost portion of tractor 12.

The forward or shorter 10 is constructed as shown in Figs. 3 and 4, and has base member 16, standards 18 and a head 20 from the upper surface of which extends a projection 22 for protrusion into an existing slot in tractor 12. Head 20 underlies slotted part 24 of tractor 12 and as the latter is lifted, part 24 rocks over the upper surface of head 20.

Stand 14 is generally U-shaped and comprises a base member 26 and a pair of legs 28. These legs are joined to base 26 as at 30 and the normally upper free ends of legs 28 are provided with saddles 32, the inner face whereof is contoured to conform with the outer periphery of axle housing 34 forming a part of tractor 12.

A flexible member 36 interconnects stands 10 and 14 in a manner to permit the entire jacking apparatus to conform to the contour of the supporting surface. In the illustrated embodiment, the supporting surface 38 is truly horizontal and does not have an uneven surface to present obstructions for interconnecting member 36 to negotiate.

Member 36 is flexible and provided with parts at spaced intervals along its length to engage pin or detent 40 on base 26 forming a part of stand 14. One end of chain 36 is anchored to stand 10 as at 42 and the length of chain 36 should be such as to allow joining stands 10 and 14 regardless of the uneven condition of the ground.

The links of chain 36 serve as the means for engaging pin 40 and when the parts are arranged as shown in Fig. 1, the lower portions of stands 10 and 14 will be operably joined.

Stand 14 is provided with a pair of flexible members 44 in the nature of chains as illustrated in Fig. 2. One end of each chain is secured to the lower portion of stand 14 while the free or normally upper end of each chain 44 is equipped with couplers in the form of hooks 46. These hooks are designed to engage links 48 at a point above connection 50 and when chains 44 are drawn taut, hooks 46 cannot move downwardly along links 48.

Hydraulic mechanism of conventional character forming a unitary part of tractor 12 and including links 48 is broadly designated by the numeral 52 and links 48 are joined to this mechanism 52 in any suitable manner as is now well known.

Control lever 54 near the driver's seat 56 renders the hydraulic mechanism 52 operative as desired and when tractor 12 is to be lifted, hydraulic mechanism 52 is brought into play by manually manipulating lever 54 to draw links 48 in the direction of the arrow shown in Fig. 1. By such movement, stands 10 and 14 are shifted toward a vertical position and the wheels of tractor 12 are raised from supporting surface 38.

During the placement of the jack, the upper ends of stands 10 and 14 are so secured that accidental dropping will not occur, i. e. the stand 10 is positioned with its lower end resting on the supporting surface and with its head 20 engaging parts 24. Projection 22 on head 20 is seated in the slot formed between spaced parts 24 to prevent lateral displacement of stand 10. Stand 14 is similarly placed in position with its base member 26 resting on the supporting surface and with the saddles 32 of its legs 28 engaging the rear axle housing 34 of the tractor. Chain 36, secured to front stand 10, is drawn tightly toward rear stand 14 and anchored on pin 40 thereof to definitely tie the front and rear stands together. Thereupon, the hooks 46 of chains 44 are engaged with links 47 at a point immediately behind connections 50. The tractor engine is then employed to actuate the hydraulic mechanism and move links 48 in the direction of the arrow (Fig. 1). As a result, chains 44 become tautened and the tractor is forced forwardly on both front and rear stands which accordingly attain a more nearly perpendicular position and thereby elevate the tractor. The arcuate surface of head 20 on stand 10 and the arcuate inner face of saddles 32 on stand 14 insure movement with a minimum amount of friction. The flexibility of members 36 and 44 insure efficient operation, regardless of conditions met with respect to surface contour, and while only the preferred embodiment of the invention has been illustrated and described, obvious deviations from specific structure will become apparent to those skilled in the art.

Having thus described the invention, what is claimed as new and desired to be secured by Letters Patent is:

1. A jack of the character described for tractors having operating links and hydraulic mechanism for moving the same, said jack comprising front and rear stands arranged at an angle to the vertical on the supporting surface beneath the tractor; a chain interconnecting the lowermost portions of said stands as the upper ends are in engagement with the tractor whereby said lowermost portions can be accurately spaced independently of the contour of the supporting surface; chains, each connected at one end thereof to the rear stand and each having a hook at the other end thereof to detachably connect said other end to said operating links whereby the stands are shifted toward a vertical position to lift the tractor from the supporting surface, one of said stands having a pin thereon for detachable engagement with a selected one of the links adjacent one end of the first named chain when the latter is serving to interconnect the said stands, whereby the effective length of the first named chain may be varied to compensate for variations in the contour of the supporting surface.

2. A jack of the character described for tractors having operating links and hydraulic mechanism for moving the same, said jack comprising front and rear stands arranged at an angle to the vertical on the supporting surface beneath the tractor; a chain interconnecting the lowermost portions of said stands as the upper ends are in engagement with the tractor whereby said lowermost portions can be accurately spaced independently of the contour of the supporting surface; chains connected at one end thereof to the rear stand and having means at the other ends thereof to detachably connect said other ends to the hydraulic mechanism whereby the stands are shifted toward a vertical position to lift the tractor from the supporting surface, one of said stands having a pin thereon for detachable engagement with one of the links of the first named chain when the latter is serving to interconnect the said stands, said front stand being provided with a projection for protrusion into an existing slot in the tractor to prevent lateral movement of the tractor relative to said stand.

IRL W. McCUE.